United States Patent
De Fontenay et al.

(10) Patent No.: US 6,375,205 B1
(45) Date of Patent: Apr. 23, 2002

(54) ARTICULATING MEANS BETWEEN TWO CONNECTING PARTS AND MOTOR VEHICLE WHEEL SUSPENSION EQUIPPED THEREWITH

(75) Inventors: Etienne De Fontenay, Decize; Philippe Jean, Beaumont, both of (FR)

(73) Assignee: Michelin AVS, Versailles (FR)

( * ) Notice: Subject to any disclaimer, the term of this patent is extended or adjusted under 35 U.S.C. 154(b) by 0 days.

(21) Appl. No.: 09/509,043

(22) PCT Filed: Aug. 10, 1998

(86) PCT No.: PCT/FR98/01780

§ 371 Date: May 24, 2000

§ 102(e) Date: May 24, 2000

(87) PCT Pub. No.: WO99/15802

PCT Pub. Date: Apr. 1, 1999

(30) Foreign Application Priority Data

Sep. 24, 1997 (FR) ............................................. 97 11869

(51) Int. Cl.⁷ ................................................ B62D 7/16
(52) U.S. Cl. ........................... 280/93.502; 280/93.508; 280/93.512; 280/124.145; 280/124.146
(58) Field of Search ....................... 280/93.502, 93.508, 280/93.51, 93.512, 124.145, 124.14

(56) References Cited

U.S. PATENT DOCUMENTS

| | | | |
|---|---|---|---|
| 2,753,190 A | | 7/1956 | Hooven ...................... 280/112 |
| 4,046,403 A | * | 9/1977 | Yoshida ....................... 280/701 |
| 4,610,461 A | | 9/1986 | Guzzetta ..................... 280/660 |
| 5,630,609 A | * | 5/1997 | Shin ............................ 280/664 |
| 6,203,038 B1 | * | 3/2001 | Bernhard ............... 280/93.502 |

FOREIGN PATENT DOCUMENTS

| | | |
|---|---|---|
| DE | 1 092 779 | 11/1960 |
| DE | 31 36 954 A1 | 3/1983 |
| DE | 32 33 878 A1 | 3/1984 |
| DE | 37 13 699 A1 | 11/1987 |
| DE | 42 42 815 A1 | 6/1993 |
| EP | 0 092 066 A1 | 10/1983 |
| EP | 0 265 059 A1 | 4/1988 |
| EP | 0 370 217 A2 | 5/1990 |
| EP | 0 548 989 A1 | 6/1993 |
| FR | 1.043.387 | 11/1953 |
| FR | 2.129.902 | 11/1972 |
| FR | 2 568 329 | 1/1986 |
| GB | 1 208 979 | 10/1970 |

OTHER PUBLICATIONS

Patent Abstracts of Japan, Publication No. 01278809, 11/89.
Patent Abstracts of Japan, Publication No. 03009118, 1/91.

* cited by examiner

Primary Examiner—Brian L. Johnson
Assistant Examiner—Deanna Draper
(74) Attorney, Agent, or Firm—Connolly Bove Lodge & Hutz, LLP

(57) ABSTRACT

An articulating between two linking parts, said articulation comprising a hinge yoke provided with two non-parallel shafts each defining an axis of rotation and carried by each of the two linking parts respectively, with elastic hinge rings inserted between capable of being stressed in torsion about the axis of rotation of the associated shaft. The invention is characterized in that the hinge yoke is provided with at least one bore for passage of a first shaft with at least an elastic hinge ring inserted between capable of being stressed in torsion about the first shaft axis of rotation (the "first axis of rotation"), such that the relative allowable angular displacement between the linking parts about the first axis of rotation results from the sum of the allowable angular displacement of the linking part relative to the first shaft and the allowable angular displacement of the first shaft relative to the hinge yoke.

24 Claims, 6 Drawing Sheets

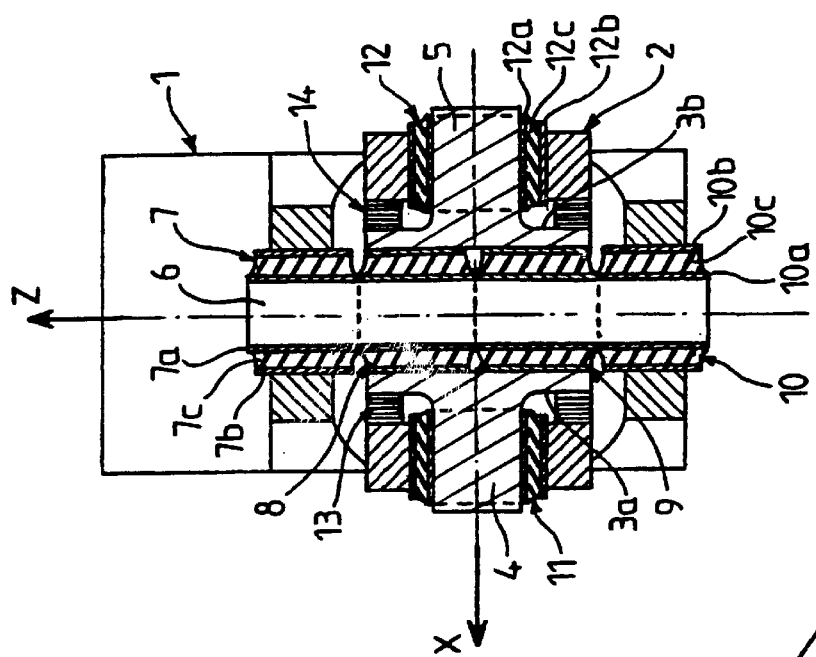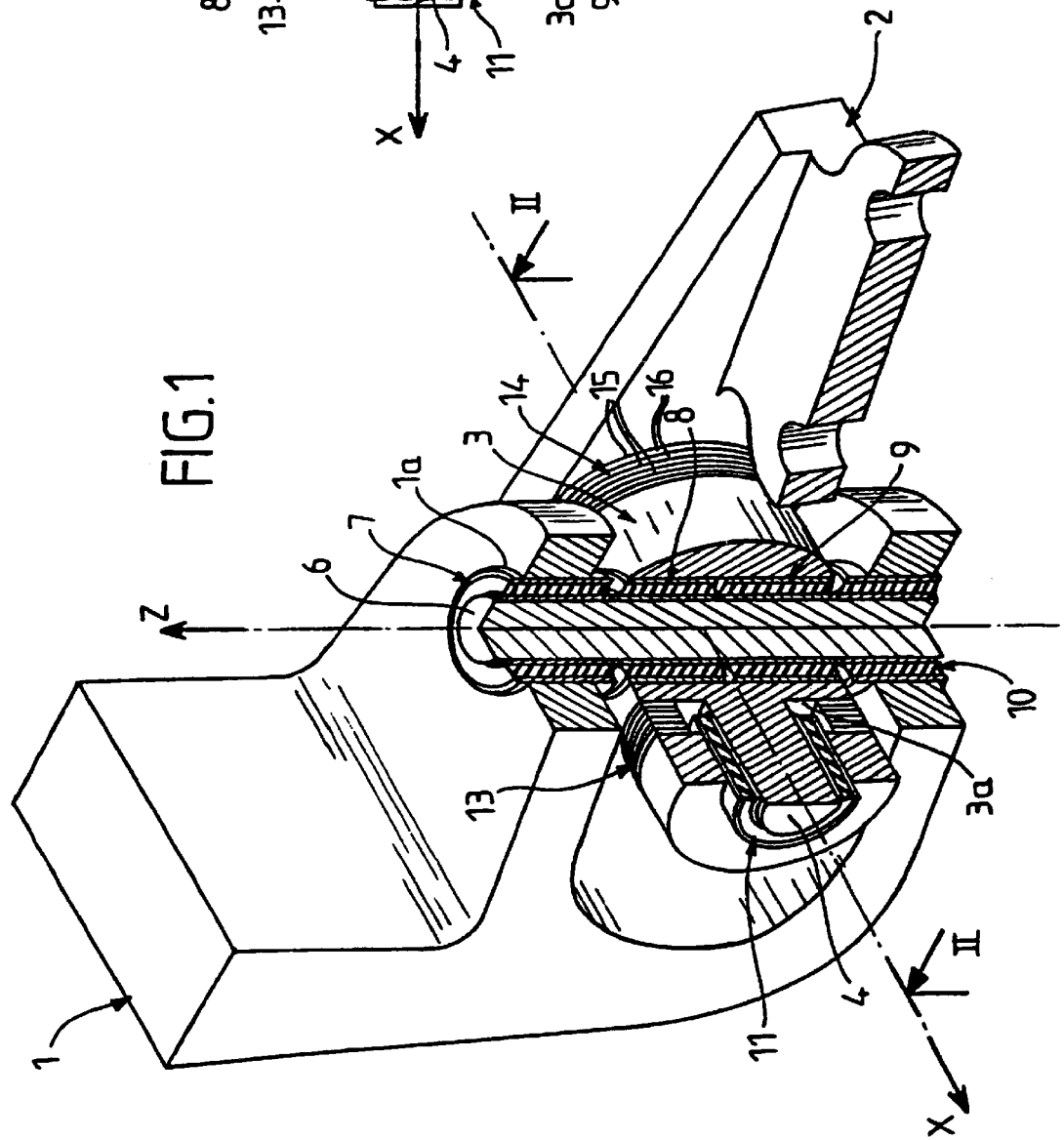

Figure 3:
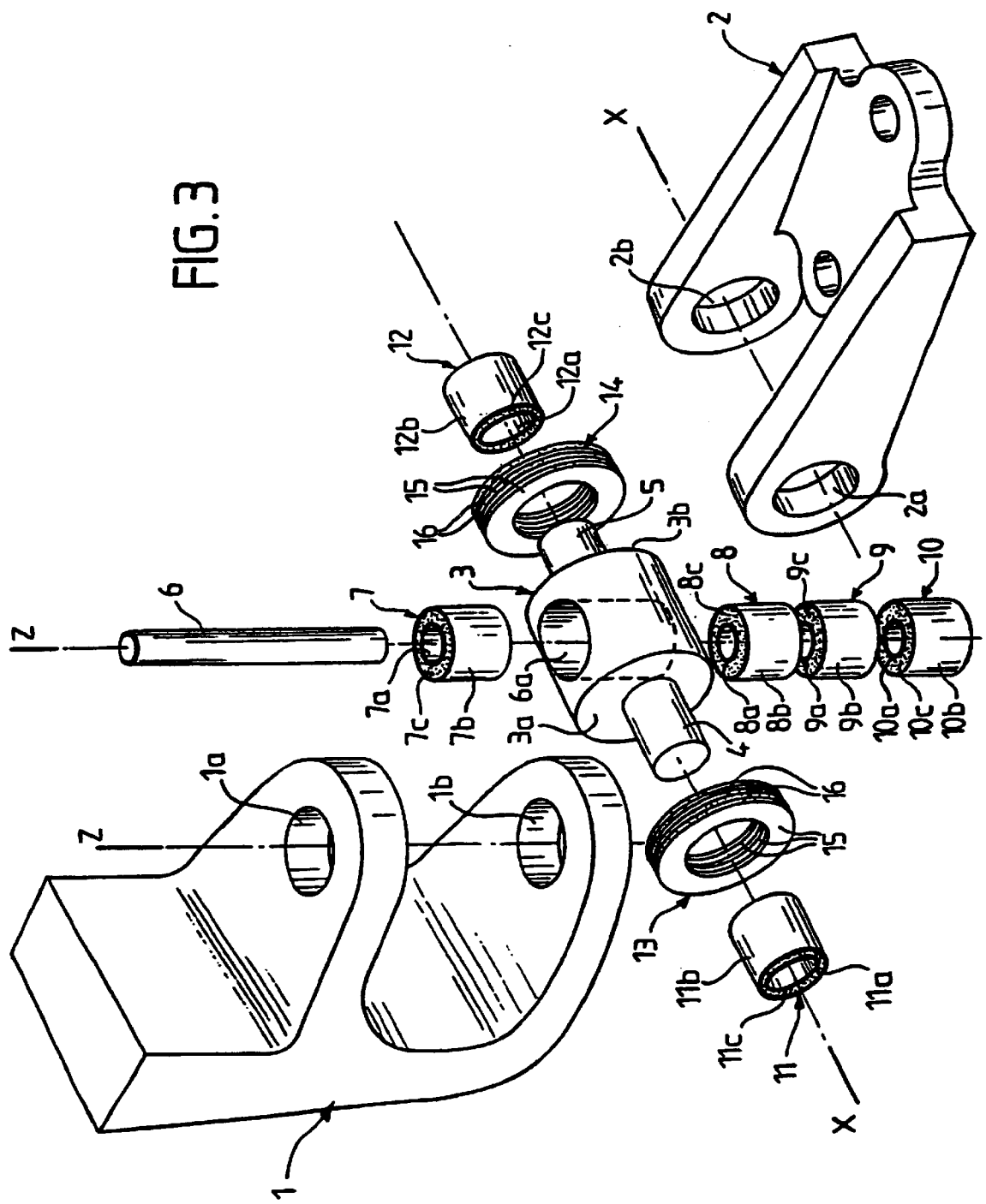

ARTICULATING MEANS BETWEEN TWO CONNECTING PARTS AND MOTOR VEHICLE WHEEL SUSPENSION EQUIPPED THEREWITH

The invention relates to a means of articulation between two connection pieces and a ground connection device for a motor vehicle wheel, particularly a steered wheel, including a piece for connecting to the hub carrier which carries the hub of the wheel of the vehicle and a piece for connecting to the steering link or to the wishbone of the suspension, these two connection pieces being articulated together by this means of articulation.

In the known state of the art, these two pieces are articulated by means of a ball joint. This ball exhibits friction, which introduces resistance to turning into the steering and introduces excessive elastic stress into the steering column. What is more, a ball joint does not perform any filtering, and this may contribute to vibration being allowed to be transmitted back up through the steering wheel.

When the ground connection is of the MacPherson type, it includes a strut mounted between the hub of the wheel and the body of the vehicle, and a coil spring mounted between a lower spring plate secured to the body of the strut and an upper spring plate secured to the rod of the strut.

In ground connections of the Mac Pherson type for steered wheels, a thrust ball bearing is mounted between the upper spring plate and the suspension tower of the vehicle. This thrust ball bearing also, when the steering is turned, has a threshold resistance to rolling, which results in a torque threshold which is undesirable in terms of the feel through the steering wheel.

There is already known, as a replacement for ball joints, a means of articulation which consists of a spider comprising two mutually perpendicular shafts each defining an axis of rotation, each shaft being borne by a connecting piece with the interposition of an elastic articulating ring capable of being stressed in torsion about the axis of rotation of the associated shaft. However, such a means of articulation has an angular displacement which is limited by the relatively poor ability of the elastic articulating ring to tolerate deformation without being damaged or without offering excessive resistance. This may lead to damage to the elastic articulating rings, particularly when the steering link is turned through a large angle.

The object of the invention is to propose a means of articulation in which the permissible angular displacement is greater.

Another object of the invention is to propose a means of articulation which improves the acoustic comfort, for example by reducing the vibration traveling back up through the steering wheel and by reducing the points of contact with the wheel.

Yet another object of the invention is to improve the known technique by eliminating the threshold resistance to turning and by supplying a means of articulation, the angular displacements of which are approximately proportional to the efforts involved in keeping the wheel on course.

To this end, the subject of the invention is a means of articulation between two connecting parts, the said means of articulation comprising an articulation yoke equipped with two non-parallel arms each defining an axis of rotation and each borne by a respective one of the two connecting pieces, with the interposition of elastic articulating rings which can be stressed in torsion about the axis of rotation of the associated shaft, characterized in that the said articulation yoke has at least one bore for the passage of a first shaft with the interposition of at least one elastic articulating ring which can be stressed in torsion about the axis of rotation (known as the "first axis of rotation") of the said first shaft so that the permissible relative angle of displacement between the connecting pieces about said first axis of rotation is the sum of the permissible angular displacement of said connecting piece with respect to said first shaft and of the permissible angle of displacement of said first shaft with respect to the articulation yoke.

Advantageously, the means of articulation includes at least one elastic articulating ring between the aforementioned bore and said first shaft and at least one separate elastic articulating ring between said first shaft and said connecting piece which bears it.

Because there are two separate elastic rings, one connecting the yoke to the first shaft and the other connecting the first shaft to the connecting piece, each of the rings works in isolation and is stressed uniformly. If use were made of just one elastic ring, part of which were connected to the yoke and another part of which were connected to the connecting piece, in the region between these two parts, the elastic ring would experience high stresses, because it would be the site of circumferential stresses in opposite directions.

In a first embodiment, the aforementioned two axes of rotation are concurrent and the articulation yoke has two coaxial journals which extend one on each side of said bore to define the second shaft of the means of articulation, said second shaft defining the second axis of rotation, the permissible angular displacement of any one of the connecting pieces about said second axis of rotation being the permissible angular displacement of said connecting piece with respect to the articulation yoke. In this case, there would be far more angular displacement about the first axis of rotation than about the second axis of rotation, for example there would be approximately twice as much. However, this means of articulation is particularly compact, by virtue of the fact that the axis of rotation are concurrent.

In another embodiment, the aforementioned two axes of rotation are not concurrent and the articulation yoke has a second bore for the passage of the second shaft with the interposition of at least one elastic articulating ring which can be stressed in torsion about the second axis of rotation associated with said second shaft, the first bore of the articulation yoke having no intersection with the second bore.

According to another feature, each elastic articulating ring consists of two coaxial tubular parts, between which an elastomeric material of low elastic modulus is molded. As a preference, the elastomeric material has a footprint on the radially interior tubular part which is longer than its footprint on the radially exterior tubular part so that the elastic ring exhibits an approximately constant shear stress, the elastic ring having an approximately constant cylindrical area regardless of its radius, by virtue of the approximately trapezoidal shape of said ring in axial section.

Advantageously, the elastic ring is chosen in such a way as to allow an angular displacement of the order of ±20° by torsional deformation of the elastic ring.

Advantageously, each connecting piece is shaped like a clevis block, the two branches of each clevis block taking, with the interposition of at least one elastic articulating ring, the ends of a shaft of the articulation yoke.

The invention is also aimed at a ground-connection device for the steered wheel of a motor vehicle, comprising a wheel hub carrier equipped with the aforementioned means of articulation, characterized in that a first connecting piece is secured to the wheel hub carrier, while the second connecting piece is secured to a steering linkage, the first axis of rotation extending approximately in a vertical direction and the second axis of rotation extending approximately in the longitudinal direction of the vehicle.

Another subject of the invention is a ground-connection device for the wheel of a motor vehicle, comprising a wheel hub carrier equipped with the aforementioned means of articulation, characterized in that a first connecting piece is secured to the wheel hub carrier, while the second connecting piece is secured to a suspension wishbone connecting to the body of the vehicle, the first axis of rotation extending approximately in a vertical direction and the second axis of rotation extending approximately in the longitudinal direction of the vehicle.

Provision may be made for the articulation yoke borne by the piece for connecting to the wishbone to be mounted in this piece with the interposition of axial stops, it being possible for each axial stop to have a number of thicknesses of elastomer separated by a number of intermediate flat rings made of a non-elastomeric material; in this case, the non-elastomeric material is advantageously chosen from the group consisting of metal leaf or foil, wovens, nonwovens, thermoplastics and thermosets. The axial stops may be mounted in the piece for connecting to the wishbone, one on each side of the shoulders which form the transition between the journals and the central part of the yoke; they are advantageously mounted with preload approximately in the longitudinal direction of the vehicle; each axial stop is preferably a laminated elastomer assembly containing annular separations made of non-elastomeric material. This axial stop can be used, in particular, when the invention is applied to the articulation between the hub carrier and the lower arm of a Mac Pherson-type suspension. A stop of this kind is not, however, of use in the application of the invention between the hub carrier and the steering linkage.

In one alternative form, the connection with the ground is of the double wishbone suspension type, in which the second suspension wishbone is connected to the wheel hub carrier by a means of articulation according to the invention.

In another alternative form, the ground connection is of the Mac Pherson type and includes a strut mounted between the hub carrier of the wheel and the body of the vehicle, and a coil spring mounted between a lower spring plate secured to the body of the strut and an upper spring plate secured to the rod of the strut, the upper spring plate being secured to a laminated elastomer assembly secured to a piece for attaching to the body of the vehicle, preferably a vehicle suspension tower.

In the case of a ground connection of this type, the piece for attaching to the body of the vehicle may be shaped as a convex cup tailored to the interior surface of the suspension tower; the piece for attaching to the body may be angularly adjustable with respect to said piece; the upper end of the coil spring may be angularly indexed by insertion in a part of the upper spring plate, which is advantageously overmolded with an elastomeric material, at least in the region against which the spring bears.

According to a first alternative form, the attachment piece is mounted so that it can pivot with respect to the body via a rotation-adjustment lever.

According to another alternative form, the attachment piece and the body each have a number of orifices located on circles of one and the same diameter and spaced apart in such a way as to allow angular indexing at the time of mechanical assembly of the piece for attachment to the body and the body.

According to another alternative form, the body has a number of first shapings and the piece for attachment to the body has a number of second shapings, and a first shaping belonging to the body collaborates with a second shaping belonging to the piece for attaching to the body, so as to provide indexing between the body and the piece for attaching to the body.

Advantageously, the piece for attaching to the body has a radially interior part collaborating with a relaxation stop to prevent the strut from disengaging if the vehicle wheel should lift off the ground and the laminated elastomeric assembly should break; the radially interior part may be coated at least partially or overmolded with a shock-damping material.

Provision may be made for the piece for attaching to the body to be shaped in such a way that it clips into the body.

By virtue of the special arrangements just described, it is possible to dispense with the upper thrust ball bearing which is usually present in a Mac Pherson-type ground connection and this can be replaced by an elastic system, the operating torque of which is approximately proportional to the angle of pivoting. An elastic system of this kind may be produced in modular form, to allow an interchangeable modular unit comprising a strut and an associated spring to be factory assembled; this system also allows the torsion of this interchangeable unit to be preadjusted following assembly with the body of the vehicle, so as to compensate for any lateral loading or any torque which might be due to the tire and to the running conditions (camber).

The invention is also aimed at a ground connection device characterized in that the wheel hub carrier is connected by two means of articulation to, respectively, the steering linkage and to the suspension wishbone, as mentioned hereinabove.

To allow better understanding of the subject-matter of the invention, a number of embodiments thereof will now be described by way of illustrative and nonlimiting example, with reference to the appended drawing.

Figure 4:
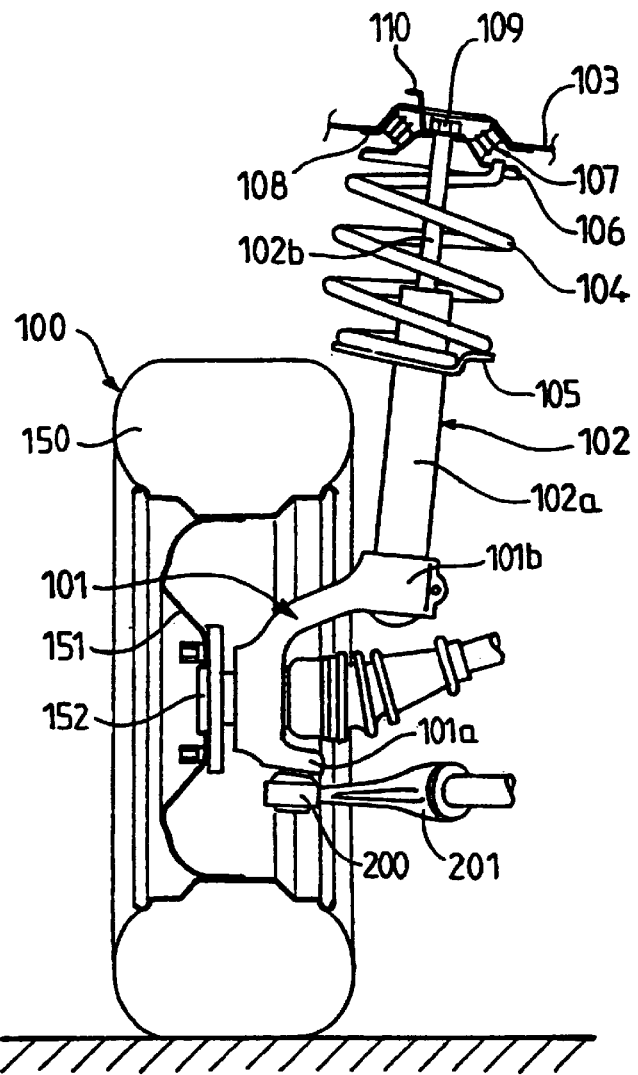
Figure 5:
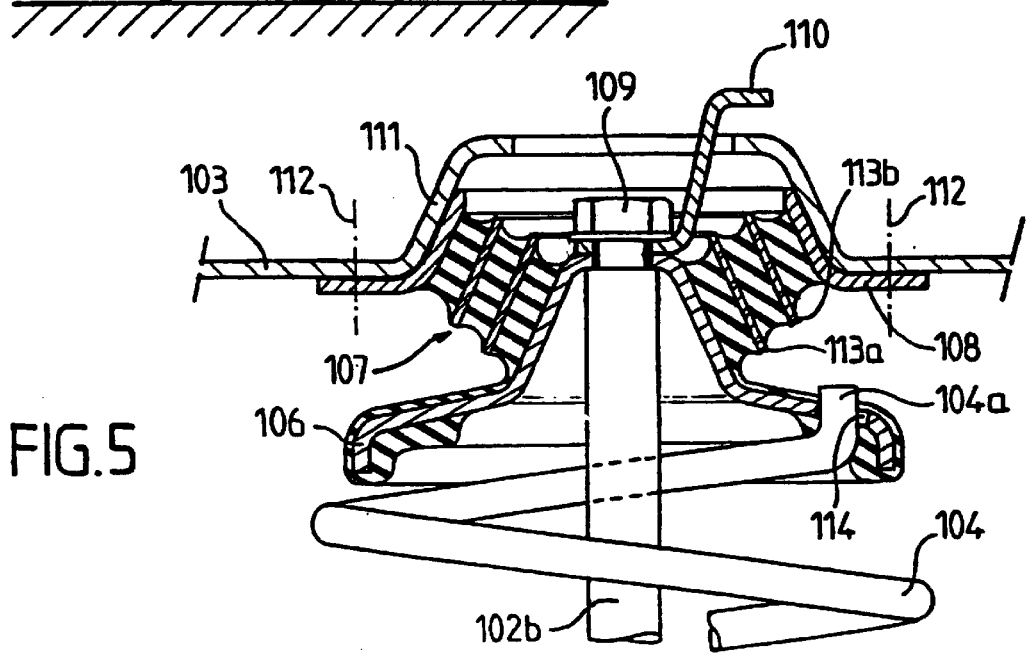
Figure 6:
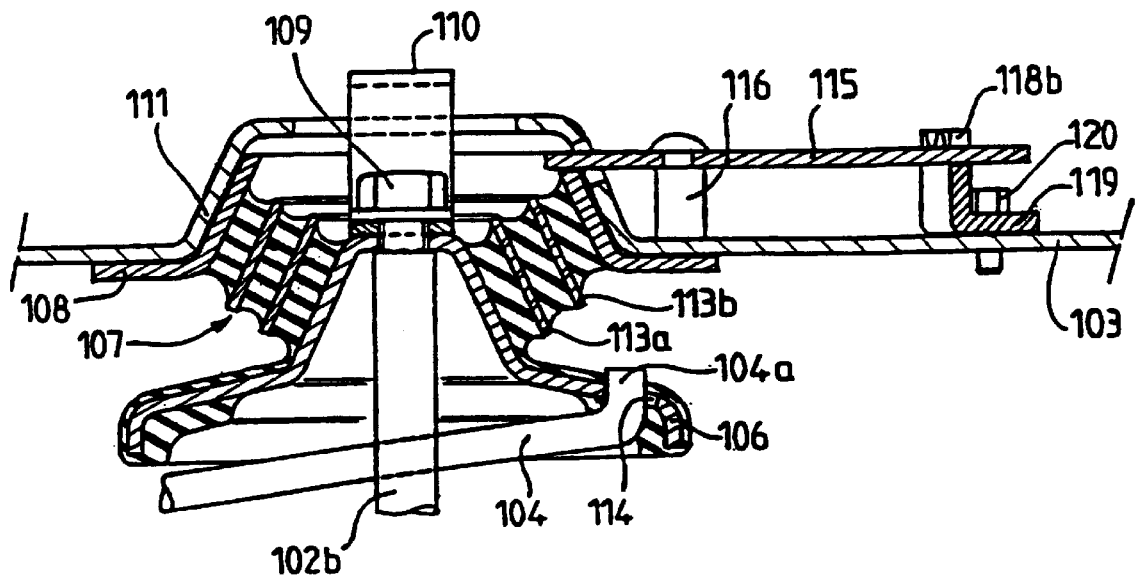
Figure 7:
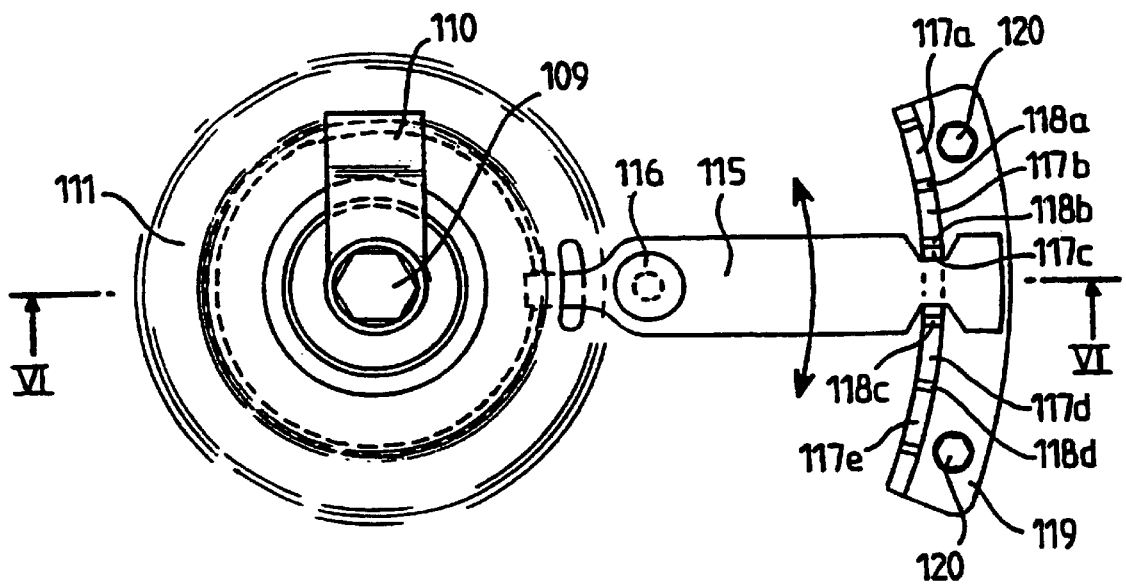
Figure 8:
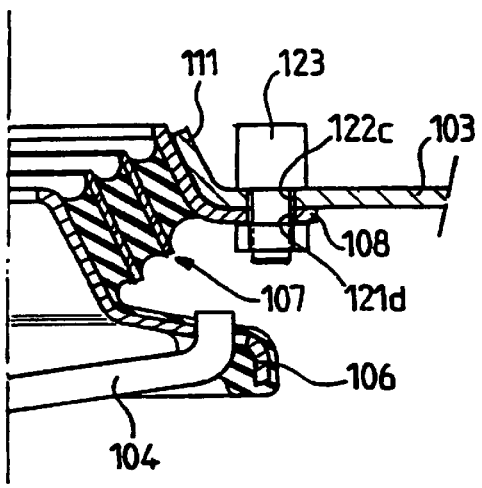
Figure 10:
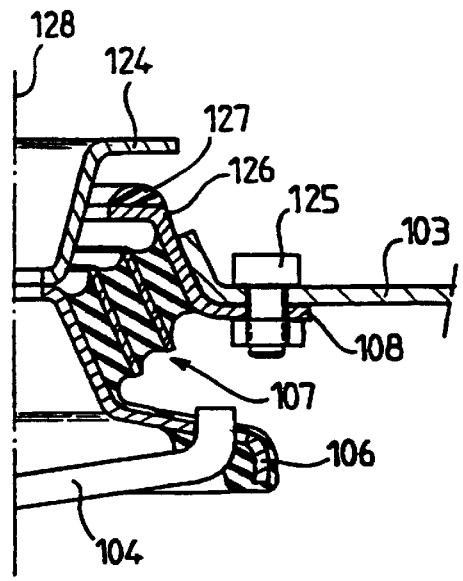
Figure 9:
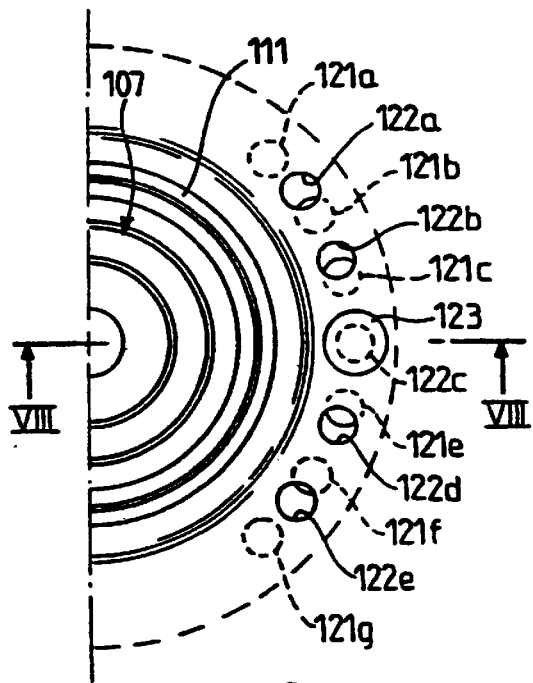
Figure 11:
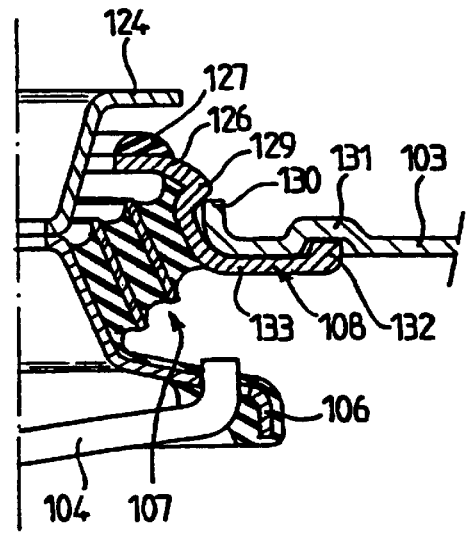
Figure 12:
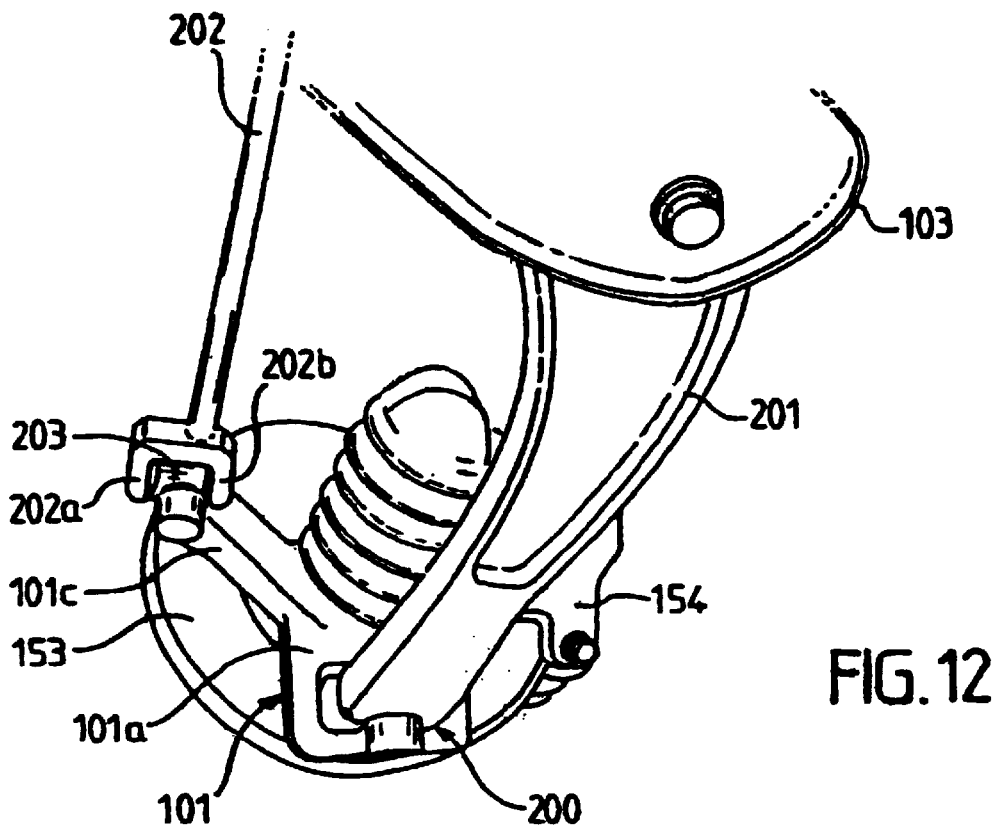
Figure 13:
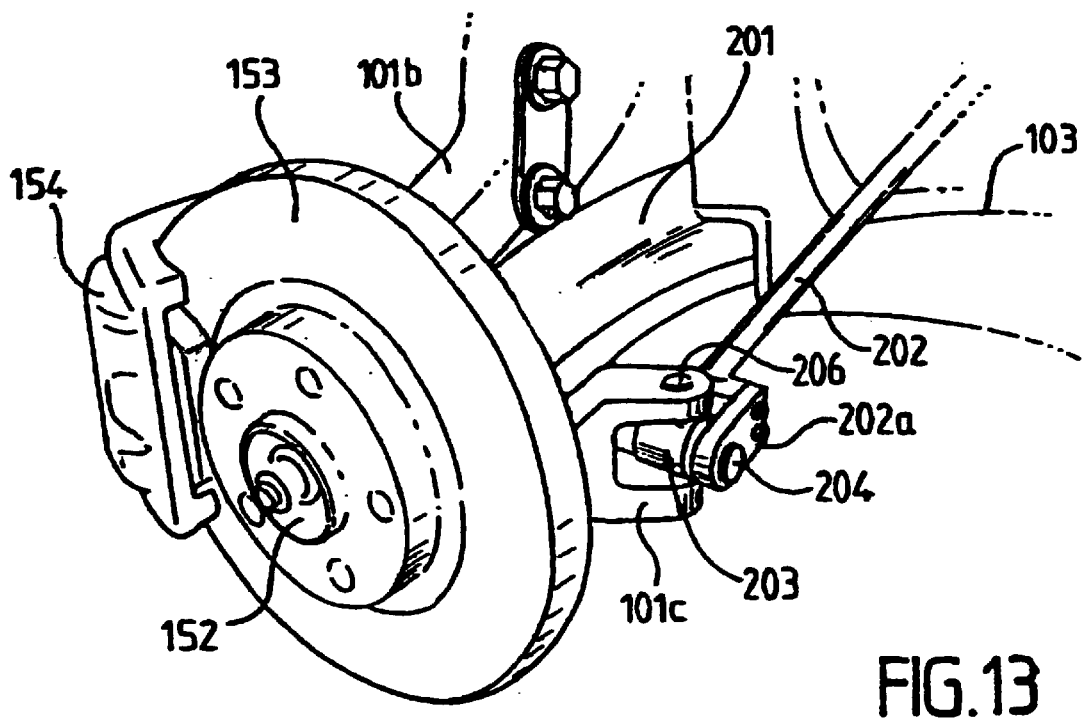

In this drawing:

FIG. 1 diagrammatically depicts a view in perspective with partial section of a device according to the invention replacing a ball joint of the state of the art at the articulation between the piece for connecting to the wheel hub carrier and the piece for connecting to the suspension wishbone of a ground-connection system;

FIG. 2 diagrammatically depicts a view in section on the vertical plane passing through the line II—II of FIG. 1;

FIG. 3 diagrammatically depicts an exploded perspective view of the articulation according to FIGS. 1 and 2;

FIG. 4 diagrammatically depicts an overall view in vertical elevation with partial section of a ground connection device according to the invention;

FIG. 5 diagrammatically depicts an enlarged partial sectioned view of the upper part of the ground connection device of FIG. 4;

FIG. 6 diagrammatically depicts an enlarged view in section on the line VI—VI of FIG. 7, of an alternative form of the device of FIG. 5;

FIG. 7 diagrammatically depicts a view from above of the device of FIG. 6;

FIG. 8 diagrammatically depicts a half view in section on the line VIII—VIII of FIG. 9, of another alternative form of the device of FIG. 5;

FIG. 9 diagrammatically depicts a half view from above of the device of FIG. 8;

FIG. 10 diagrammatically depicts a half view in section of another alternative form of the device of FIG. 5;

FIG. 11 diagrammatically depicts a half view in section of a last alternative form of the device of FIG. 5;

FIG. 12 is a part view in perspective of a ground connection device according to the invention, for a steered front wheel of a motor vehicle, showing the means of articulation between, on the one hand, a wheel hub carrier and, on the other hand, a steering linkage and a suspension wishbone, seen from the inboard side and from below; and FIG. 13 is a part view in perspective of the ground connection device of FIG. 12, seen from the outboard side and from above.

Referring to the drawing, it may be seen that identical reference numerals have been adopted for those elements of the various alternative forms which are identical or functional equivalents.

FIG. 4 depicts a ground connection device of the Mac Pherson type, in which a wheel assembly 100, comprising a pneumatic treaded tire 150 mounted on a wheel rim 151 is placed on the hub 152 of a wheel hub carrier 101 of a motor vehicle. A strut 102 is mounted between an upper arm 101b of the hub carrier 101 and the body 103 of the vehicle. A coil spring 104 is mounted between a lower spring plate 105 secured to the body 102a of the strut 102 and an upper spring plate 106 mounted secured to the rod 102b of the strut 102. The wheel hub carrier 101 is connected by a lower arm 101a to a suspension wishbone 201 of the vehicle by an articulation 200 the details of which are depicted in FIGS. 1 to 3.

In FIGS. 1 to 3, it may be seen that a clevis block 1 for connecting with the hub carrier bearing the wheel of the vehicle is articulated to a clevis block 2 for connecting to the suspension wishbone. It will be noted that the clevis block 1 can be produced as a single piece with the arm 101a of the hub carrier 101 and that the clevis block 2 may also be made as a single piece with the suspension wishbone 201.

The clevis block 2 for connecting with the suspension wishbone bears a yoke 3 with two shaft stubs 4 and 5. The yoke 3 has a bore 6a through which an axis of articulation 6 borne by the clevis block 1 for connecting with the hub carrier passes.

According to the invention, elastic articulating rings 7 to 12 are interposed between the axes of articulation 4, 5 and 6 and the corresponding clevis blocks 1 and 2.

Each elastic articulating ring 7 to 12 is in the form of two tubular parts 7a to 12a, 7b to 12b connected together by an elastomer 7c to 12c of low hardness below 50 degrees Shore A. As a preference, each elastic ring 7 to 12 is made by molding the elastomer directly between the tubular parts 7a to 12a, 7b to 12b.

The fact that an elastomeric material with a low elastic modulus has been chosen makes it possible to obtain a large angular displacement without requiring an appreciably force; thus, about the axis X corresponding to rotation about the shaft stubs 4 and 5, there is an angular displacement of the order of ±20° of angle in one direction or the other starting from a mean position whereas, about the axis Z corresponding to rotation about the axis of articulation 6, there is an angular displacement of the order of 50° of angle in one direction or the other with respect to a mean position. The fact that the permissible rotation about the axis Z is more than twice the permissible rotation about the axis X is because the permissible angles of the end elastic rings 7 and 10 and the permissible rotations of the intermediate rings 8 and 9 mounted in the yoke 3 are summed.

Given that the rings 8 and 9 are subjected to the same stresses resulting from the articulation relative to the yoke 3 about the axis 6, it is possible, without departing from the scope of the present invention, to replace the two rings 8 and 9 with a single ring of twice the length.

As a preference, the radially interior tubular parts 7a to 12a are longer than the radially exterior tubular parts 7b to 12b. This arrangement makes for a longer line of contact with the axes of articulation 4 to 6 and protects the intermediate elastomeric materials 7c to 12c.

The device according to the invention is mounted on the vehicle in such a way that the axis X, the axis corresponding to the direction of the shaft stubs 4 and 5, is approximately parallel to the longitudinal axis of the vehicle in the direction of forward travel.

High braking or acceleration forces are therefore transferred to the yoke 3 by the movement of the clevis block 2 as the vehicle travels along. To balance these forces, axial stops 13 and 14 are interposed between the branches of the clevis block 2 and the articulation yoke 3 through which the axis of articulation 6 passes. Each axial stop 13 or 14 preferably includes a number of elastomeric thicknesses 15 separated by a number of intermediate flat rings 16 made of a non-elastomeric material.

As a preference, the non-elastomeric material is a material which has good shear or torsional strength, chosen from a group comprising, in particular, metal leaf or foil, wovens, nonwovens, thermoplastics and thermosets. The essential feature is that the non-elastomeric material should be compatible with the elastomeric material 15 to allow them to catch together and secure the assembly.

As a preference, the axial stops are one-piece laminated assemblies produced by molding elastomer between the intermediate flat rings 16 or are formed of a stack of rubberized washers. These assemblies are preferably mounted with an axial preload of 5000 N in the direction of the axis X. For this purpose, the axial stops 13 and 14 are made to press, one on each side, against shoulders 3a, 3b which form the transition between the shaft stubs 4 and 5 and the central part of the yoke 3.

FIG. 3 depicts the device disassembled and in exploded perspective. The device is assembled in such a way that the parallel axes X are aligned as are the parallel axes Z after assembly.

The clevis block 1 for connecting to the hub carrier has two eyelets 1a, 1b which take the ends of the shaft 6 with the interposition of the elastic rings 7 to 10. The tubular parts 7b, 10b are immobilized with respect to the eyelets 1a, 1b in a known way by force-fitting. The radially interior parts 7a to 12a are immobilized on each of the corresponding axes of articulation 4 to 6 in the same way.

The clevis block 2 for connecting to the suspension wishbone is depicted as a single piece. Without departing from the scope of the present invention, it is also possible to produce this clevis block by assembling several distinct elements, the essential thing being that the eyelets 2a, 2b, aligned along the axis X, be able to take the shaft stubs 4 and 5 with the interposition of the elastic rings 11 and 12. These elastic rings are mechanically assembled and the elastic stops 13 and 14 are preloaded, again in a known way requiring no more detailed description.

The invention described with reference to one particular embodiment also covers all alternative forms and all modifications of a device having three degrees of freedom in rotation. It will be noted that one degree of freedom of small amplitude may also be found in the articulation proposed by the present invention. Thus, the means of articulation may have three degrees of freedom of rotation, in the manner of a ball joint, two degrees of freedom being defined about the two aforementioned axes of rotation, the third degree of freedom being of small amplitude and defined by the rocking about an axis perpendicular to the two aforementioned axis of rotation, by stressing the elastic articulating rings in tension and in compression.

Referring now more specifically to FIG. 5, it may be seen that at the upper part of the strut 102, the upper spring plate 106 is secured to a laminated elastomeric assembly 107, itself secured to a piece 108 for attaching to the body 103 of the vehicle.

In the known way, the nut 109 for attaching the rod 102b of the strut to the upper spring plate 106 also holds in place a relaxation stop 110 which prevents the strut from disengaging if the vehicle wheel should lift off the ground and the laminated elastomeric assembly 107 should break.

The body 103 of the vehicle is shaped in such a way as to have a suspension tower 111. The piece 108 for attaching to the body 103 of the vehicle is advantageously shaped as a convex cup tailored to the interior surface of the suspension tower 111. The piece 108 is attached to the body 103 by a mechanical assembly, bolts or screws depicted by the center lines 112. The laminated elastomeric assembly 107 essentially consists of molded elastomer with a low torsional strength with thin metal cone frustums 113a, 113b interposed between the layers of elastomer.

The laminated assembly obtained by overmolding elastomer with a hardness lower than 50 degrees Shore has low torsional strength over a wide range of angular deflection. The effect of laminating this assembly is that the torsion angles of each elastomer cone frustum interposed between the upper spring plate 106, the first cone frustum 113a, the second cone frustum 113b, and the convex cup 108, can be summed.

Advantageously, provision is made for the upper spring plate 106 to be overmolded, at least in the vicinity of the orifice 114 in which the end 104a of the spring 104 engages in the spring plate 106. This at least local overmolding makes it possible to avoid impact noises while at the same time fixing the end 104a of the coil spring 104 so that it is angularly indexed. In order to avoid needless further overmolding operations, the overmolding is preferably performed in a single operation, which means that the upper surface of the spring plate 106 and most of its flared interior part is also overmolded.

The invention described with reference to frustoconical parts 113a, 113b made of metal is not in any way restricted to this metal, but also extends to cover other materials which can be overmolded and which have a stiffer property in torsion than the overmolding elastomer; mention may, in particular, be made of textiles, nonwovens, thermoplastics or thermosets which can be overmolded. The essential feature is that the angularly deformable regions consisting of the elastomer overmolded parts be separated from the regions of torsional rigidity consisting of the intermediate cone frustums 113a, 113b.

FIGS. 6 and 7 define an alternative form of the articulation of FIG. 5. In this alternative form, the piece 108 for attachment to the body is angularly adjustable with respect to the suspension tower 111 of the body 103. For this purpose, a lever 115 engaged in a notch at the top of the piece 110 is mounted on a spindle 116 secured to the body 103; provision may be made for the interposition of an anti-friction material between the piece 108 and the tower 111. The opposite end of the lever 115 to the end which is welded to the piece 108 is shaped in such a way that it can engage in recesses 117a to 117e separated by adjusting notches 118a to 118d. The recesses 117 and the notches 118 are made in a piece 119, for example an arc-shaped bracket, fixed to the body 103 by mechanical assembly (bolting, screwing, spot welding, etc.).

FIGS. 8 and 9 depict another alternative form of the articulation of FIG. 5. In this alternative form, the piece 108 for attaching to the suspension tower 111 of the body 103 has a number of orifices 121a to 121g. Near the suspension tower 111, the body 103 has a number of orifices 122a to 122e located approximately on the same diameter as the orifices 121a to 121g. The orifices 121 are uniformly spaced with a different spacing from the uniform spacing of the orifices 122. The attachment piece 108 can thus be angularly adjusted with respect to the body 103 in the manner of a vernier, so as to precisely index the attachment piece 108 angularly with respect to the body 103. Once this adjustment has been made, the piece 108 is mechanically assembled to the suspension tower 111 using an assembly screw or bolt 123.

The invention thus provides a means for the torsional adjustment of the ground connection, so as to at least partially compensate for side pull or drifting due to the tire.

FIG. 10 depicts a particularly advantageous embodiment of the device of FIG. 5. In this embodiment, the upper spring plate 106 is assembled by means of the rod of the strut 104b and the nut 109 (not depicted) with a relaxation stop 124 which advantageously has a shape of revolution. The piece 108 for attaching to the body 103 by means of the mechanical assembly 125 has a radially interior part 126 which collaborates with the bounce or relaxation stop 124 to prevent the strut from disengaging if the vehicle wheel should rise or lift off the ground.

The radially interior part 126 is advantageously coated or at least partially overmolded with a shock-resistant material, for example a polyamide. In the example depicted, the overmolding 127 is in an annular shape approximately coaxial with the axis of revolution 128.

This advantageous embodiment of the invention allows the strut assembly comprising the relaxation stop 124, the radially interior part 126 of the attachment piece 108, the laminated assembly 107, the upper spring plate 106, the strut 102 and the spring 104 mounted on the lower spring plate 105 to be factory manufactured.

FIG. 11 depicts an alternative form of the device of FIG. 10. In this alternative form, the attachment piece 108 has an annular rim 129 designed to clip into the rim 130 of the body 103.

To provide indexing between the body 103 and the attachment piece 108, the body 103 has a number of indentations 131 and the attachment piece 108 has a number of bosses 132 mounted on flexible levers 133. The bosses 132 and the indentations 131 are spaced with different spacings so as to provide precise indexing between the body 103 and the attachment piece 108 by engaging a boss 132 in an indentation 131. Adjustment is performed in the manner of a vernier, in a way similar to what was described with reference to FIG. 9.

Of course the invention extends to cover the collaboration of any recessed shaping with any raised shaping, the shapings being located one on the attachment piece 108 and the other on the body 103.

The invention is not in any way restricted to the alternative forms described hereinabove, but extends to cover any device comprising a spring and a strut, involving a laminated elastomeric assembly, the angle of rotation of which is approximately proportional to the torque applied, without displaying any threshold, and having an arrangement which allows a modular unit comprising an associated strut and spring, ready to be assembled directly with the body or suspension tower of the vehicle, to be manufactured at the factory.

Referring now to FIGS. 12 and 13, it can be seen that the wheel hub carrier 101 is fitted with a brake disk 153 which is intended to collaborate with a brake caliper 154. The wheel hub carrier 101 has a lever 101c which is connected to a means of articulation 203 according to the invention to a steering linkage 202 which at its end has a clevis block shape with two parallel branches 202a and 202b, through which the journals 204 of the articulation yoke 203 of the means of articulation are mounted. The lever 101c of the wheel hub carrier 101 also has a clevis block for housing the body of the articulation yoke 203 between its branches and the rotation shaft 203 through its branches. The means of articulation 203 is approximately similar to the means of articulation 200 for the suspension wishbone, except for the axial stops which are not present at the articulation with the steering linkage 202.

Of course, the invention is not restricted to a means of articulation having two concurrent axes of rotation, but may also apply to a means of articulation which has two offset rotation shafts, the axes of which are not concurrent.

What is claimed is:

1. Means of articulation between a first and second connecting piece, the said means of articulation comprising an articulation yoke equipped with a first and second non-parallel shaft, said first shaft defining a first axis of rotation and said second shaft defining a second axis of rotation and each shaft carried by a respective one of the two connecting pieces, with the interposition of elastic articulating rings therebetween, wherein said rings can be stressed in torsion about the axis of rotation of the associated shaft, wherein said articulation yoke includes at least one bore for the passage of the first shaft with the interposition of at least one first elastic articulating ring therebetween, wherein the at least one first ring can be stressed in torsion about the first axis of rotation of the said first shaft so that the permissible relative angle of displacement between the connecting pieces about said first axis of rotation is the sum of the permissible angular displacement of said respective connecting piece that carries said first shaft with respect to said first shaft and of the permissible angle of displacement of said first shaft with respect to the articulation yoke.

2. Means of articulation according to claim 1, wherein said means of articulation includes said at least one first elastic articulating ring between said bore and said first shaft and at least one separate elastic articulating ring between said first shaft and said connecting piece that carries said first shaft.

3. Means of articulation according to claim 1, wherein said two axes of rotation are concurrent and the articulation yoke has two coaxial journals which extend one on each side of said bore to define said second shaft of the means of articulation, the permissible angular displacement of any one of the connecting pieces about said second axis of rotation being the permissible angular displacement of said connecting piece with respect to the articulation yoke.

4. Means of articulation according to claim 1, wherein said two axes of rotation are not concurrent and the articulation yoke has a second bore for the passage of the second shaft with the interposition of at least one elastic articulating ring therebetween which can be stressed in torsion about the second axis of rotation, the first bore of the articulation yoke having no intersection with the second bore.

5. Means of articulation according to claim 4, wherein the elastomeric material includes a footprint on the radially interior tubular part which is longer than the footprint on the radially exterior tubular part so that the elastic ring exhibits an approximately constant shear stress, the elastic ring having an approximately constant cylindrical area regardless of its radius, by virtue of the approximately trapezoidal shape of said ring in axial section.

6. Means of articulation according to claim 1, wherein each elastic articulating ring comprises two coaxial tubular parts comprising a radially interior tubular part and a radially exterior tubular part between which an elastomeric material of low elastic modulus is molded.

7. Means of articulation according to claim 1, wherein at least one of said elastic rings is chosen in such a way as to allow an angular displacement of the order of ±20° by torsional deformation of the elastic ring.

8. Means of articulation according to one of claim 1, wherein each connecting piece is shaped like a clevis block having two branches, the said two branches of each clevis block taking, with the interposition of at least one respective elastic articulating ring therebetween, the ends of a respective one of the said first and second shaft of the articulation yoke.

9. A motor vehicle equipped with a ground-connection device for the steered wheel, comprising a wheel hub carrier equipped with the means of articulation according to claim 1, wherein a first one of the said connecting pieces is secured to the wheel hub carrier, while a second one of the said connecting pieces is secured to a steering linkage, the first axis of rotation extending approximately in a vertical direction and the second axis of rotation extending approximately in the longitudinal direction of the vehicle.

10. A motor vehicle equipped with a ground-connection device for the steered wheel, comprising a wheel hub carrier equipped with the means of articulation according to claim 1, wherein a first one of the said connecting pieces is secured to the wheel hub carrier, while a second one of the said connecting pieces is secured to a suspension wishbone connecting to a body of the vehicle, the first axis of rotation extending approximately in a vertical direction and the second axis of rotation extending approximately in the longitudinal direction of the vehicle.

11. Vehicle according to claim 10, wherein the articulation yoke is carried by the second connecting piece for connecting to the wishbone and is mounted in the second connecting piece with the interposition of axial stops.

12. Vehicle according to claim 11, wherein each axial stop has a number of thicknesses of elastomer separated by a number of intermediate flat rings made of a non-elastomeric material.

13. Vehicle according to claim 12, wherein the non-elastomeric material is chosen from the group consisting of metal leaf or foil, wovens, nonwovens, thermoplastics and thermosets.

14. Vehicle according to claim 11, wherein said two axes of rotation are concurrent and the articulation yoke has two coaxial journals which extend one on each side of said bore to define said second shaft of the means of articulation, the permissible angular displacement of the second connecting piece about said second axis of rotation being the permissible angular displacement of said second connecting piece with respect to the articulation yoke, and the axial stops are mounted in the second connecting piece for connecting to the wishbone one on each side of shoulders which form the transition between the said journals and a central part of the articulation yoke.

15. Vehicle according to claim 11, wherein the axial stops are mounted with preload approximately in the longitudinal direction of the vehicle.

16. Vehicle according to claim 11, wherein each axial stop is a laminated elastomer assembly containing annular separations made of non-elastomeric material.

17. Vehicle according to claim 10, wherein the ground connection is of the Mac Pherson type and includes a strut mounted between the hub carrier of the wheel and the body of the vehicle, and a coil spring mounted between a lower spring plate secured to the cylinder of the strut and an upper spring plate secured to the rod of the strut, the upper spring plate being secured to a laminated elastomer assembly secured to an attachment piece for attaching to the body of the vehicle.

18. Vehicle according to claim 17, wherein the attachment piece for attaching to the body is angularly adjustable with respect to the body.

19. Vehicle according to claim 18, wherein the attachment piece is mounted so that it can pivot with respect to the body via a rotation-adjustment lever.

20. Vehicle according to claim 18, wherein the attachment piece and the body each have a number of orifices located on one and the same diameter and spaced apart in such a way as to allow angular indexing at the time of mechanical assembly of the attachment piece for attachment to the body.

21. Vehicle according to claim 18, wherein the body has a number of first shapings and the attachment piece has a number of second shapings, and in that, in order to provide for indexing between the body and the attachment piece, a first shaping of the body collaborates with a second shaping belonging to the attachment piece.

22. Vehicle according to claim 17, wherein the upper end of the coil spring is angularly indexed by insertion in a part of the upper spring plate, said part being overmolded with an elastomeric material.

23. Vehicle according to one of claim 17, wherein the attachment piece has a radially interior part collaborating with a relaxation stop to prevent the strut from disengaging if the vehicle wheel should lift off the ground and the laminated elastomeric assembly should break.

24. A hinge yoke for connecting a first and second linking part comprising:

a first non-parallel arm having a first axis of rotation, said first arm carried by said first linking part including at least one first elastic articulating ring interposed therebetween, wherein said at least one first ring can be stressed in torsion about the first axis of rotation;

a second non-parallel arm having a second axis of rotation, said second arm carried by said second linking part including at least one second elastic articulating ring interposed therebetween, wherein said at least one second ring can be stressed in torsion about the second axis of rotation;

at least one bore for the passage of said first arm with the interposition of at least one first elastic articulating ring which can be stressed in torsion about the first axis of rotation of the said first arm so that the permissible relative angle of displacement between the said first and second linking parts about said first axis of rotation is the sum of the permissible angular displacement of said first linking part with respect to said first shaft and of the permissible angle of displacement of said first shaft with respect to said articulation yoke.

\* \* \* \* \*